Sept. 18, 1934.       M. A. GIBSON       1,974,021
TIRE TOOL
Filed April 6, 1934

Inventor
M. A. Gibson
By Clarence A. O'Brien
Attorney

Patented Sept. 18, 1934

1,974,021

UNITED STATES PATENT OFFICE 1,974,021

TIRE TOOL

Martin A. Gibson, Alliance, Nebr.

Application April 6, 1934, Serial No. 719,380

1 Claim. (Cl. 157—6)

This invention appertains to new and useful improvements in tire tools, and more particularly to a novel implement whereby a tire casing can be removed from its rim in an easy and convenient manner.

The principal object of the present invention is to provide a tire removing tool which is of simple construction, not susceptible to the development of defects and which in use will be durable and require the minimum amount of physical exertion.

Other important objects and advantages of the invention will become apparent to the reader of the following specification.

Figures 1, 2:
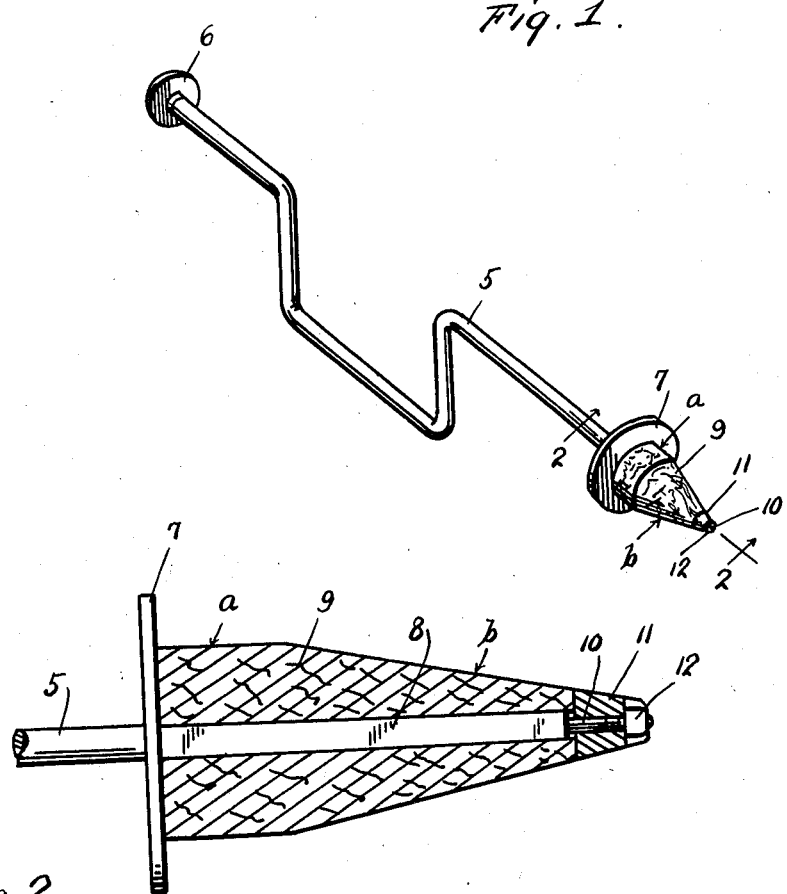
Figure 1 represents a perspective view of the tool.
Figure 2 represents an enlarged fragmentary detailed sectional view taken substantially on line 2—2 of Figure 1.

Referring to the drawing wherein like numerals designate like parts, it can be seen that the tool consists of a brace made up of the crank shaft 5 having the breast or palm knob 6. The forward end of this shaft 5 is provided with the disk-shaped plate 7 from which extends the squared shank 8. A body 9 of hard rubber or some similar material is provided with a squared opening longitudinally therethrough for receiving the shank 8. The body 9 is provided with a cylindrical inner portion $a$ and the frusto-conical extension $b$ merging at its enlarged portion with the cylindrical portion $a$.

The squared shank 8 is provided with a reduced and threaded extension at 10 over which the collar 11 is disposed. A nut 12 is engageable onto this extension 12 to maintain the collar 11 very snugly against the reduced end of the body 9 so that the body 9 in turn will rest snugly against the disk 7.

The disk 7 serves to keep the remover from coming out from its position between the casing and the rim. In operating the device, the brace is turned and in this operation the tire will hug the conical body 9 and flange or disk 7. The disk need only be large enough so that it will not slip over the rim nor let the tire casing slip over itself. In this operation of winding the tire off, the casing is not bruised, as frequently happens in the use of tire irons.

While the foregoing specification sets forth the invention in specific terms, it is to be understood that numerous changes in the shape, size and materials may be resorted to without departing from the spirit and scope of the invention as claimed hereinafter.

What is claimed is:—

A tire tool comprising a rotatable handle, a flange on the handle adjacent the work engaging end thereof, the end portion of the handle beyond the flange being squared, a conical shaped body having a square opening therethrough, for receiving the squared end portion of the handle and a fastening member on the outer end of the squared portion of the handle to prevent displacement of the conical member therefrom and to hold the same from rubbing against the said flange.

MARTIN A. GIBSON.